United States Patent [19]

Werner et al.

[11] Patent Number: 4,630,803
[45] Date of Patent: Dec. 23, 1986

[54] SUSPENSION-STRUT MOUNTING FOR INSTALLATION BETWEEN A SHOCK-ABSORBER STRUT OR SPRING STRUT AND A VEHICLE BODY SPRING-SUPPORTED WITH RESPECT TO THE AXLES, IN PARTICULAR OF A MOTOR VEHICLE

[75] Inventors: Hans Werner, Fellbach-Oeffingen; Frank Knothe, Stuttgart; Paul Graf, Koengen; Henning Wallentowitz, Aichwald; Hans-Hermann Keller, Notzingen; Alfred Kist, Stuttgart, all of Fed. Rep. of Germany

[73] Assignee: Daimler-Benz Aktiengesellschaft, Stuttgart, Fed. Rep. of Germany

[21] Appl. No.: 693,051

[22] Filed: Jan. 22, 1985

Related U.S. Application Data

[63] Continuation of Ser. No. 414,389, Sep. 2, 1982, abandoned.

[30] Foreign Application Priority Data

Sep. 4, 1981 [DE] Fed. Rep. of Germany ....... 3135043

[51] Int. Cl.[4] .................... B60G 15/06; F16F 9/54
[52] U.S. Cl. .................... 267/8 R; 188/321.11; 248/636; 248/659; 267/35; 267/63 R; 267/140.1
[58] Field of Search ............... 267/35, 63, 57.1, 8 R, 267/123, 122, 118, 121, 113, 140.1, 117, 140.4, 145, 153, 152, 64.27, 64.19, 151, 64.23, 140.2, 140.3, 140.5–141.7, 64.25; 188/298, 321.11; 248/638, 636, 659, 621, 562; 180/292, 312, 300; 280/712, 716

[56] References Cited

U.S. PATENT DOCUMENTS

| | | | |
|---|---|---|---|
| 1,414,623 | 5/1922 | Church | 267/64.23 |
| 2,610,017 | 9/1952 | Lambert, Jr. et al. | 267/121 X |
| 2,874,647 | 2/1959 | Candlin, Jr. | 267/35 X |
| 2,930,607 | 3/1960 | Hutzenlaub | 267/35 |
| 2,999,682 | 9/1961 | Stump | 267/64.23 |
| 4,211,429 | 7/1980 | Howard | 280/716 |
| 4,399,987 | 8/1983 | Cucelli et al. | 267/35 X |
| 4,420,060 | 12/1983 | Kakimoto | 180/300 |
| 4,424,960 | 1/1984 | Dan et al. | 267/153 X |
| 4,469,316 | 9/1984 | Van Den Boom et al. | 267/113 X |

FOREIGN PATENT DOCUMENTS

| | | | |
|---|---|---|---|
| 1178262 | 12/1958 | France | 267/118 |
| 0109840 | 8/1980 | Japan | 267/140.1 |
| 2041485 | 9/1980 | United Kingdom | 267/121 |
| 2068080 | 8/1981 | United Kingdom | |
| 2086530 | 5/1982 | United Kingdom | 267/121 |
| 2105438 | 3/1983 | United Kingdom | 188/321.11 |

Primary Examiner—Douglas C. Butler
Attorney, Agent, or Firm—Barnes & Thornburg

[57] ABSTRACT

A suspension-strut mounting for installation between a shock-absorber strut or spring strut and a vehicle body spring-supported with respect to the axles, with at least one connecting element having elastically resilient and vibration damping properties which is connected both with the body as also with the piston rod of a shock-absorber of the shock-absorber strut or spring-strut; an additional vibration damper is provided in parallel with the connecting element.

25 Claims, 5 Drawing Figures

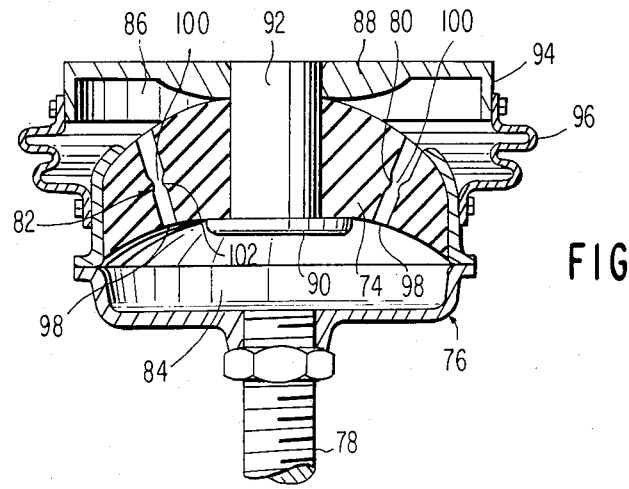
FIG 4
FIG. 5
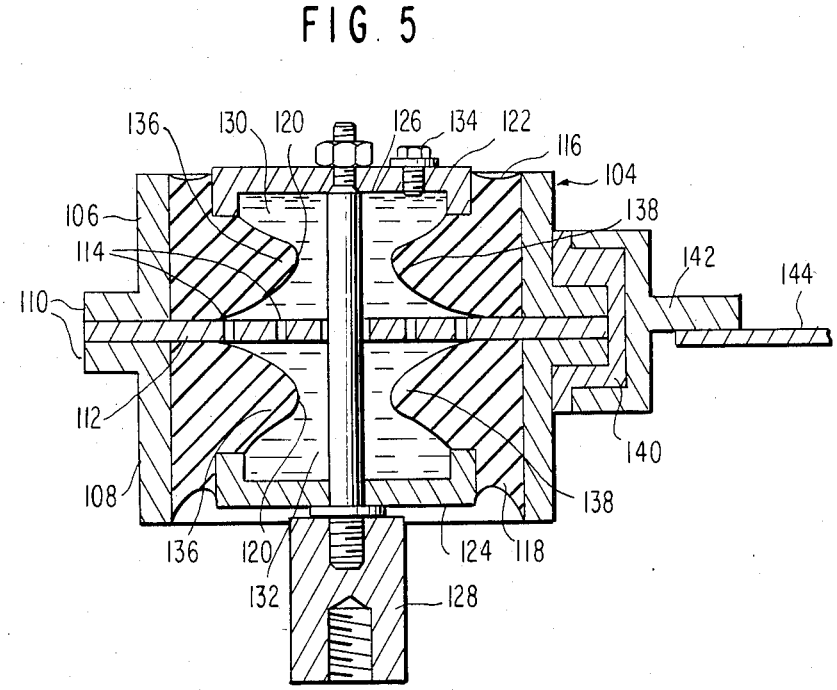

SUSPENSION-STRUT MOUNTING FOR INSTALLATION BETWEEN A SHOCK-ABSORBER STRUT OR SPRING STRUT AND A VEHICLE BODY SPRING-SUPPORTED WITH RESPECT TO THE AXLES, IN PARTICULAR OF A MOTOR VEHICLE

This is a continuation of application Ser. No. 414,389, filed Sept. 2, 1982, now abandoned.

The present invention relates to a suspension-strut mounting for installation between a shock-absorber strut or spring strut and a body of a vehicle, especially of a motor vehicle, spring-supported with respect to the axles, with at least one elastically resilient connecting element connected both with the body as also with the piston rod of a shock-absorber of the shock-absorber strut or of the spring strut.

With the suspension-strut mountings of the aforementioned type that are used in automotive engineering (compare German Offenlegungsshcrift No. 29 35 610; German Offenlegungsschrift No. 27 45 380; German Offenlegungsschrift No. 24 33 583), the elastically resilient connecting member contributes to a high spring comfort and serves at the same time for the noise insulation to suppress far-reaching driving noises otherwise transmitted from the chassis to the vehicle body.

However, under certain circumstances, the driving behavior of a vehicle can be impaired by the elasticity of the connecting element.

This deterioration in the driving behavior results from the fact that, for reasons concerned with noise and comfort, the aim is to employ suspension-strut mountings having soft characteristics which may lead to undamped vertical vibrations of vehicle axles, especially on roads in good condition, since the main shock-absorber of the shock-absorber struts or of the spring struts do not respond at all in case of very small inward and outward deflections.

The cause therefor stems from the friction present between the piston and shock-absorber tube, and/or from the friction present between the piston rod and the upper shock-absorber seal.

Admittedly, the energy content of the axle vibrations resulting from these conditions is only very small; however, it leads to a pattering movement of the axles, manifesting itself in an unpleasant manner, which additionally may influence also the vibration behavior of other vehicle aggregates.

The present invention is therefore concerned with the task to provide a suspension-strut mounting of the type described above which is capable of preventing the axle vibrations explained hereinabove.

The underlying problems are solved according to the present invention in that the suspension-strut mounting also possesses vibration damping properties.

In the suspension-strut mounting according to the present invention, shock forces normally initiating small axle vibrations are reduced to a manageable magnitude by reason of its damping capacity and are converted into another irreversible energy form.

Consequently, it is also prevented by the suspension-strut mounting in accordance with the present invention that the kinetic energy causing the axle vibrations can become effective at other structural parts.

The present invention may be realized in numerous forms, some of which will be described specifically hereinafter by reference to the various figures.

These and other objects, features and advantages of the present invention will become more apparent from the following description when taken in connection with the accompanying drawing which shows, for purposes of illustration only, several embodiments in accordance with the present invention, and wherein.

FIG. 4 is a longitudinal cross-sectional view through still another embodiment of a suspension-strut mounting in accordance with the present invention whose elastically resilient connecting element is combined with a pneumatically operating damper connected in parallel therewith; and FIG. 5 is a longitudinal cross-sectional view through a still further embodiment of a suspension-strut mounting in accordance with the present invention whose damper is integrated into the elastically resilient connecting element.

Figure 1:
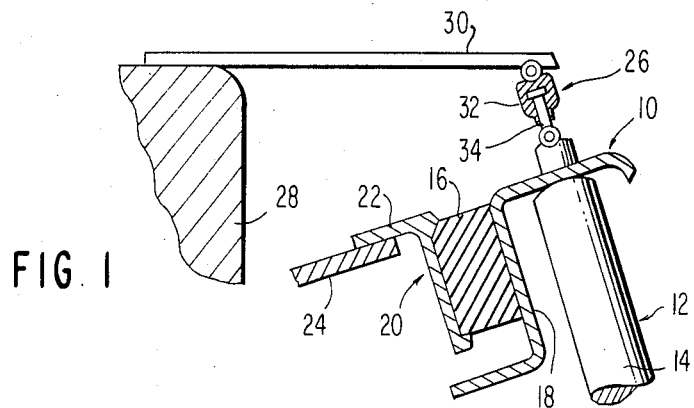
FIG. 1 is a longitudinal cross-sectional view through a suspension-strut mounting in accordance with the present invention whose elastically resilient connecting element is combined with a damper arranged separately thereform.

Referring now to the drawing wherein like reference numerals are used throughout the various views to designate like parts, the suspension-strut mounting illustrated in FIG. 1 comprises a sheet-metal assembly plate generally designated by reference numeral 10, for example, bent in the shape of a "Z", which is secured in any suitable, known manner at the free end of a piston rod generally designated by reference numeral 12 of a shock-absorber strut 14 installed, for example, in a vehicle.

Reference numeral 16 designates an elastically resilient connecting element which is preferably formed by a flat block consisting of rubber, that is bonded with one of its flat sides onto the leg 18 of the assembly bracket or plate 10 which extends approximately parallel to the piston rod 12, and with its oppositely disposed flat side to an angle-shaped attachment member generally designated by reference numeral 20; the bonding may be carried out thereby by any known vulcanizing process.

The connecting element 16 forms together with the assembly plate 10 and the attachment member 20 a vibration-damping connection of the type using a rubber/metal bonded unit which, as already explained, is secured, on the one hand, at the piston rod 12 and, on the other, at a part 24 of a vehicle body by means of a leg 22 of the attachment member 20.

A damper generally designated by reference numeral 26 is coordinated to the elastically resilient connecting element 16; the damper 26 is retained independently of the vibration-damping rubber/metal bonded connection formed by the parts 10, 16 and 20, on the one hand, at the free end of the piston rod 12, and, on the other, on a cross bracket 30 attached, for example, to the engine block 28 of the respective vehicle engine.

This damper 26 possesses, for example, an elastically resilient lining 32 of rubber retained at the transverse support bracket 30; an anchoring member 34 which is embedded in the rubber lining, is retained at the piston rod 12 in a suitable manner.

With this type of construction of the suspension-strut mounting, the vibration-absorbing connection of the rubber/metal bonded unit 10, 16, 22 and the damper 26 are retained on different vibrating masses of the vehicle, whereby the damper 26 damps shocks directly introduced into the same directly by the piston rod 12, which are not absorbed or only insufficiently damped by the shock-absorber strut 14.

Figure 2:
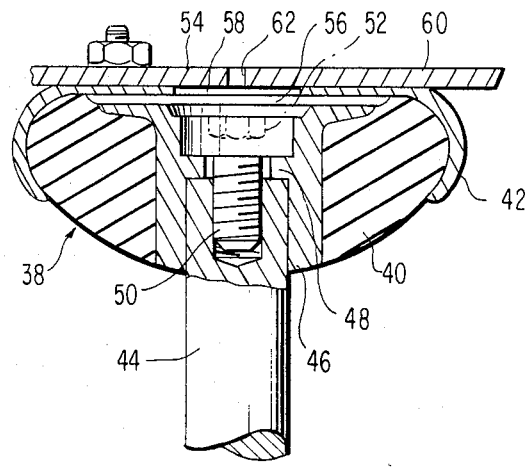
FIG. 2 is a longitudinal cross-sectional view through a second embodiment of a suspension-strut mounting in accordance with the present invention whose elastically resilient connecting element operates pneumatically and is connected in parallel with a damper combined therewith into a structural unit.

FIG. 2 illustrates a suspension-strut mounting in accordance with the present invention in which an elastically resilient connecting element that is constructed as a vibration-damping connection in the form of a rubber/metal bonded unit, is disposed in parallel with a damper.

The vibration-damping connection in the form of a rubber/metal bonded unit generally designated by reference numeral 38 includes in this embodiment a rubber body 40 which is preferably convexly curved at its accessible bottom side and which is retained with its upper portion in a cup-shaped socket 42 preferably by being vulcanized in situ.

A flanged bush 46 which includes at its inner circumference an annular shoulder 48 and which is vulcanized in situ into the rubber body 40 serves for the connection of the rubber/metal bonded vibration-damping unit 38 with a piston rod 44 of a shock-absorber strut.

The piston rod 44 is to be inserted with its free end into this flanged bush 46 and is to be threadably secured by means of a fastening bolt 50 to be extended with its shank through the annular shoulder 48, whereby the fastening bolt 50 abuts with its bolt head 52 at the annular shoulder 48.

The damper connected in parallel with the vibration-damping rubber/metal bonded unit 38 is formed by an intermediate space 56 present between the rubber body 40, respectively, the flanged bush 46 and the bottom 54 of the cup-shaped socket 42; in the illustrated embodiment, the intermediate space 56 is in communication with the atmosphere. For this purpose, an opening 58 is provided in the bottom 54 of the socket 42, which, in turn, is covered off by a cover plate 60 bolted onto the bottom 54; the cover plate 60 may form at the same time a part of a vehicle body, at which the shock-absorber strut in question is to be supported. A bore 62 which establishes the communication between the intermediate space 56 and the atmosphere and which acts as a throttle is coordinated to the intermediate space 56 in the cover plate 60. Of course, the throttle may also have any other suitable known construction.

The advantage of this construction of the suspension-strut mounting in accordance with the present invention resides in that, in addition to the desired damping, also a progressively increasing spring effect is achieved by the air volume present in the intermediate space 56 during inward spring deflection of a vehicle axis and a vacuum effect is produced during the outward spring deflection thereof. The vacuum, which becomes effective during outward spring deflection, reinforces the spring force of the rubber body 40.

Figure 3:
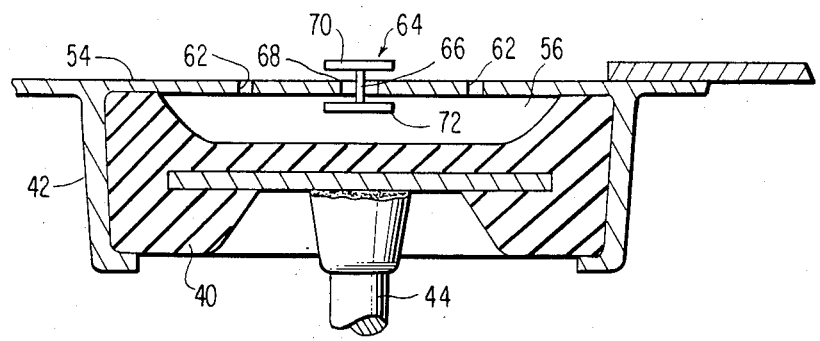
FIG. 3 is a longitudinal cross-sectional view through a modified embodiment of a suspension-strut mounting in accordance with the present invention which is constructed in principle in a similar manner to that of FIG. 2.

The modified construction of the suspension-strut mounting illustrated in FIG. 3, which differs from the construction illustrated in FIG. 2, essentially only in that the intermediate space 56 of the damper which is provided between the bottom 54 of the cup-shaped socket 42 and the rubber body 40 retained therein, is of larger volume, for which purpose a correspondingly larger recess is formed or molded into the rubber body 40. Additionally, the throttle of the embodiment of FIG. 3 which includes several throttle bores 62 in the bottom 54, differs in principle from the construction described in connection with FIG. 2 in that it is equipped with an additional valve generally designated by reference numeral 64 which assures for a rapidly proceeding pressure equalization in the intermediate space 56 during outward spring deflections. For that purpose, the valve 64 includes a valve member which is arranged freely movably in a bore 68 of the bottom 54, which has a relatively large cross section, in such a manner that it sealingly closes off the bore 60 by means of a respective closure disk 70 and 72 after a predetermined shift travel in the inward and outward spring deflection direction of the shock-absorber strut during the axial movements of the piston rod 44 occurring thereby in alternate directions.

Whereas in the suspension-strut mountings according to FIGS. 2 and 3, the throttle possesses a constant flow cross section in the suspension-strut mounting according to FIG. 4, it is so constructed that the through-flow cross section thereof adjusts itself automatically for a desired damping intensity in dependence on the gas pressure that builds up within the space.

For this purpose, a rubber body 74 forms the upper closure of a cup-shaped connecting part generally designated by reference numeral 76 which is adapted to be secured to the free end of a piston rod 78 of a shock-absorber strut or spring strut. The rubber body 74 and the connecting part 76 define together a first one of two spaces 84 and 86 of a closed damping system which communicate with each other by way of throttles generally designated by reference numerals 80 and 82.

The second space 86 is formed by a plate 88 disposed on the rubber body 74 having a convex curvature; the plate 88 is thereby nondetachably secured at the rubber body 74, for example, by means of a retaining bolt 92 extending centrally through the rubber body and abutting with a flange 90 against the bottom side thereof. This plate 88 includes, according to FIG. 4, a downwardly extending cylindrical circumferential wall 94. A bellows 96 is clamped in a gas-tight manner onto the cylindrical circumferential wall 94 as well as onto the outer circumference of the connecting part 76 for the purpose of forming the space 86 closed off with respect to the atmosphere.

The throttles 80 and 82, of which several may be provided in the rubber body 74, are formed by channels 98 extending through the rubber body 74, which possess a constricted throttling cross section 100 approximately at half the length thereof. Within this closed system, the throttle cross section is dependent on the pressure of the medium flowing from one to the other space in that with an increasing pressure, the throttle cross section will become larger in proportion to the pressure. This is possible because the throttle devices defining the throttle cross sections are molded into the channels 98 for example, in the form of annular shoulders 102.

The described pressure-proportional change of the throttle cross section could also be used with a construction which includes only the space 84 which could then be in communication with the atmosphere by way of the channels 98.

The closed system according to FIG. 4 offers the advantage that contaminations cannot enter into the damper. Furthermore, the air acts essentially only dampingly by reason of the flexible bellows 96 and does not act as additional spring as, for example, in connection with the construction of FIGS. 2 and 3.

FIG. 5 illustrates a hydraulically damped suspension-strut mounting. It includes a bearing housing generally designated by reference numeral 104 which is formed, for example, of two hollow cylinders that are bolted together by means of flanges 110 formed integrally therewith, whereby the two hollow cylinders retained therebetween a separating plate 112 which is provided with a number of throttle bores 114 that extend therethrough and are disposed distributed on mutually concentric circles.

One spring element 116, respectively, 118 is arranged in each hollow cylinder. They consist preferably of rubber and are vulcanized onto the inner circumference of the hollow cylinders. The rubber bodies 116 and 118 are each traversed in the axial direction by an opening 120 which is closed off at the outer end face of the respective rubber body by a closure plate 122, respectively, 124 vulcanized into the corresponding rubber body. These two closure plates 122 and 124 which are coaxial to one another, are rigidly connected with each other by means of a connecting rod 126 extending through the separating plate 112, whereby the connecting rod 126 is screwed with its end portion projecting out of the housing 104, for example, into a connecting part 128 which, in turn, can be secured at the free end of the piston rod of a shock-absorber strut or spring strut, for example, by being screwed onto the same. The two rubber bodies 116 and 118 define together with the closure plates 122 and 124 and the separating plate 112, two closed spaces 130 and 132 communicating with each other by way of the throttle bores 114; the spaces 130 and 132 are filled with hydraulic oil by way of a filler opening adapted to be closed by means of a screw plug 134.

The cross section of the opening 120 of the two spring elements 116 and 118 constructed as rubber bodies, is smallest approximately in the center between the outer end faces of the rubber bodies and the separating plate 112 when the pressure conditions in both spaces 130 and 132 are balanced, and then becomes successively larger in both directions in such a manner that all of the throttle bores 114 are exposed by the rubber bodies under these conditions.

As viewed in cross section, these rubber bodies 116 and 118 therefore include lobe-shaped projections 136 and 138 which are mutually symmetrical and point radially inwardly. These lobe-shaped projections 136 and 138 serve for the regulation of the damper action in that, depending on the direction of movement, one of the two chambers is compressed and the other is correspondingly expanded during axial movement forced upon the connecting rod 126 by way of the piston rod of a shock-absorber strut or spring strut during the inward and outward spring deflections of a vehicle axle, whereby an overflow of hydraulic oil from one to the other chamber takes place by way of the throttle bores 114 and the damper action is produced thereby.

Depending on the intensity of the shocks which become effective on the suspension-strut mounting, the inner annular shoulder of one of the rubber bodies 116 or 118 which appear in cross section as lobe-shaped projections is thereby displaced in the direction toward the separating plate in such a manner that numerous throttle bores 114 are covered off by the same in a manner preventing flow therethrough. A progressively increasing spring action is thus produced with this suspension-strut mounting by the damper under certain circumstances; additionally, almost any desired damping characteristics may be achieved, particularly if, according to a further inventive feature of this suspension-strut mounting, the inner annular shoulder defining the opening 120 is not constructed rotationally symmetrically along its periphery.

The bearing housing 104 can be secured, for example, to a vehicle sheet-metal part 144 by means of an elastic lining, especially by an intermediate rubber layer 140 and an assembly bracket 142 in a manner which is both simple and provides effective sound insulation.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A suspension-strut mounting for installation between a shock-absorbing strut and a vehicle body spring supported with respect to axles, comprising at least one resiliently elastic vibration-damping connecting means operatively connected with the vehicle body and with a piston rod of said strut, additional vibration damping means operable in parallel to said connecting means, said additional damping means including a flow medium disposed in at least one space means, and wherein said connection and additional damping means operate to reduce vibrations in the same direction as, and independently of, the piston of the shock absorbing strut and even when said piston does not operate to absorb shocks.

2. A suspension-strut mounting according to claim 1, characterized in that said additional damping means is located between a part of the connecting means and the vehicle body.

3. A suspension-strut mounting according to claim 1, characterized in that the space means containing the flow medium includes throttling means to achieve a defined damping action.

4. A suspension-strut mounting according to claim 3, characterized in that the through-flow cross section of the throttling means is adjustable for purposes of establishing a desired damping action.

5. A suspension-strut mounting according to claim 3, characterized in that the throttling means includes means for automatically adjusting the throttling cross section thereof for a desired damping intensity in dependence on the pressure build-up in the space means.

6. A suspension-strut mounting according to claim 3, characterized in that the damper means operates pneumatically and the space means containing the flow medium is in communication with the atmosphere by way of the throttling means.

7. A suspension-strut mounting according to claim 6, characterized in that a pressure equalization valve means is coordinated to the throttling means, said pressure equalization valve means being operable to close with predetermined delay in both flow directions of the air.

8. A suspension-strut mounting according to claim 3, characterized in that the flow medium of the additional damping means is provided in a closed system which includes at least two space means communicating with each other by way of the throttling means.

9. A suspension-strut mounting according to claim 8, characterized in that the two space means of the additional damping means are separated from each other by a part of the connecting means.

10. A suspension-strut mounting according to claim 9, characterized in that said part includes the throttling means.

11. A suspension-strut mounting according to claim 10, characterized in that said part is a rubber/metal bonded means.

12. A suspension-strut mounting according to claim 11, characterized in that the throttle means located inside of the rubber/metal bonded means has a cross section that changes automatically as a function of pressure in the respective space means.

13. A suspension-strut mounting according to claim 12, characterized in that said flow cross section changes automatically in proportion to the pressure build-up in the respective space means.

14. A suspension-strut mounting according to claim 8, charcterized in that the throttle means between the two space automatically adjusts a quantity of medium to be displaced between the two space means in dependence on inward deflection of the piston rod.

15. A suspension-strut mounting according to claim 14, characterized in that the two space means are located inside of a housing means and are separated from each other by an apertured plate means of said throttle means which also includes flexible regulating elements coordinated to the apertured plate means along the walls of each space means, said flexible regulating elements being operable to cover up the apertured plate means over corresponding surface areas for regulating the displacement quantity of medium as a function of inward deflection of the piston rod of the strut.

16. A suspension-strut mounting according to claim 15, characterized in that a noise-insulating intermediate layer is provided between the housing means and the vehicle body.

17. A suspension-strut mounting according to claim 8, characterized in that the flow medium in the closed system is a hydraulic medium.

18. A suspension-strut mounting according to claim 17, characterized in that the throttle means between the two spaces automatically adjusts a quantity of hydraulic medium to be displaced between the two space means in dependence on inward deflection of the piston rod.

19. A suspension-strut mounting according to claim 18, characterized in that the two space means are located inside of a housing means and are separated from each other by an apertured plate means of said throttle means which also includes flexible regulating elements coordinated to the apertured plate means along the walls of each space means, said flexible regulating elements being operable to cover up the apertured plate means over corresponding surface areas for regulating the displacement quantity of hydraulic medium as a function of inward deflection of the piston rod of the strut.

20. A suspension-strut mounting according to claim 19, characterized in that a noise insulating intermediate layer is provided between the housing means and the vehicle body.

21. A suspension-strut mounting according to claim 20, characterized in that said insulating intermediate layer essentially consists of rubber.

22. A suspension-strut mounting according to claim 1, characterized in that the connecting means is constructed as vibration-damping rubber/metal bonded unit.

23. A suspension-strut mounting according to claim 22, characterized in that the rubber/metal bonded unit forms at least a part of walls of the space means containing the flow medium.

24. A suspension-strut mounting according to claim 23, characterized in that the space means is formed as recess in the side of the rubber/metal bonded unit opposite the piston rod and the throttling means is arranged in a closure plate covering off the recess, said closure plate serving at the same time for securing the suspension-strut mounting at a body part.

25. A suspension-strut mounting according to claim 1 or 2, characterized in that the connecting means is constructed as vibration-damping rubber/metal bonded unit.

* * * * *